(12) United States Patent
Li et al.

(10) Patent No.: US 11,513,334 B2
(45) Date of Patent: Nov. 29, 2022

(54) PERISCOPE LENS MODULE OF MOBILE TERMINAL AND MOBILE TERMINAL (71) Applicant: HUAWEI TECHNOLOGIES CO., LTD., Guangdong (CN)

(72) Inventors: An Li, Shenzhen (CN); Qingping Wang, Shenzhen (CN); Kaicheng Zhou, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 450 days.

(21) Appl. No.: 16/569,962

(22) Filed: Sep. 13, 2019

(65) Prior Publication Data
US 2020/0004007 A1   Jan. 2, 2020

Related U.S. Application Data (63) Continuation of application No. PCT/CN2017/117254, filed on Dec. 19, 2017.

(30) Foreign Application Priority Data

Mar. 15, 2017 (CN) .......................... 201710153828.4
May 26, 2017 (CN) .......................... 201710385488.8

(51) Int. Cl.
G02B 23/08   (2006.01)
G02B 7/02    (2021.01)
G02B 13/00   (2006.01)
H04N 5/225   (2006.01)

(52) U.S. Cl.
CPC ............... *G02B 23/08* (2013.01); *G02B 7/02* (2013.01); *G02B 13/001* (2013.01); *H04N 5/2254* (2013.01); *H04N 5/2257* (2013.01)

(58) Field of Classification Search
CPC ........ G02B 23/08; G02B 7/02; G02B 13/001; H04N 5/2254; H04N 5/2257
See application file for complete search history.

(56) References Cited

U.S. PATENT DOCUMENTS

2012/0105983 A1    5/2012  Huang
2013/0063832 A1*   3/2013  Ohno ................... H04N 5/2254
                                              359/823
2013/0258493 A1*  10/2013  Hsieh ..................... G02B 7/102
                                              359/676

(Continued)

FOREIGN PATENT DOCUMENTS

CN        101630111 A    1/2010
CN        102455476 A    5/2012
(Continued)

Primary Examiner — William R Alexander
Assistant Examiner — Sharrief I Broome
(74) Attorney, Agent, or Firm — Womble Bond Dickinson (US) LLP (57) ABSTRACT A periscope lens module of a mobile terminal and the mobile terminal are disclosed. The periscope lens module includes a motor housing and a lens. The lens includes an enclosure, a first lens, and a second lens. The enclosure includes a first cylinder and a second cylinder connected to the first cylinder. At least one gap penetrating a sidewall of the first cylinder is disposed on the sidewall. The first lens is fastened in the first cylinder, and the second lens is fastened in the second cylinder.

20 Claims, 4 Drawing Sheets (56) References Cited

U.S. PATENT DOCUMENTS

| | | | |
|---|---|---|---|
| 2013/0314810 A1* | 11/2013 | Sekimoto | G02B 27/646 |
| | | | 359/823 |
| 2014/0146214 A1 | 5/2014 | Nakajima et al. | |
| 2015/0077628 A1* | 3/2015 | Kim | H04N 5/2253 |
| | | | 348/374 |
| 2016/0381346 A1* | 12/2016 | Hsu | H04N 13/296 |
| | | | 348/47 |

FOREIGN PATENT DOCUMENTS

| | | | |
|---|---|---|---|
| CN | 104181669 A | | 12/2014 |
| CN | 105005132 A | | 10/2015 |
| EP | 1429168 A2 | | 6/2004 |
| JP | 10227961 A | * | 8/1998 |
| JP | H10227961 A | | 8/1998 |
| JP | 2005300690 A | | 10/2005 |
| JP | 2011154249 A | | 8/2011 |
| JP | 2013105049 A | | 5/2013 |
| JP | 6063754 B2 | | 1/2017 |
| TW | 201217846 A | | 5/2012 |

* cited by examiner

PERISCOPE LENS MODULE OF MOBILE TERMINAL AND MOBILE TERMINAL

CROSS-REFERENCE TO RELATED APPLICATIONS

This application is a continuation of International Application No. PCT/CN2017/117254, filed on Dec. 19, 2017, which claims priority to Chinese Patent Application No. 201710153828.4, filed on Mar. 15, 2017 and Chinese Patent Application No. 201710385488.8, filed on May 26, 2017, The disclosures of the aforementioned applications are hereby incorporated by reference in their entireties.

TECHNICAL FIELD

This application relates to the field of mobile terminal technologies, and in particular, to a periscope lens module of a mobile terminal and the mobile terminal.

BACKGROUND

A horizontal dimension (vertical to an optical axis direction) of a long-focus lens of a current light and thin mobile terminal device such as a mobile phone or a tablet computer usually depends on a forefront lens group. To be light and thin, the long-focus lens is usually in a periscope folding structure. Therefore, the horizontal dimension of the lens determines a module height. However, because the mobile terminal such as the mobile phone or the tablet computer is affected by a thickness, the module height is greatly affected. The module height is strongly correlated with an aperture value of a lens. To be specific, the module height determines a diameter of a lens on a light injection side of a module. A larger diameter of the lens on the light injection side of the module indicates a smaller aperture value of the lens. The aperture value of the lens directly affects photographing quality, such as resolution or a low-illumination imaging capability. A smaller aperture value indicates better photographing quality. However, when the module height is limited and the module cannot be made larger, a diameter of a first lens is limited. Consequently, an aperture value of the lens cannot be smaller, greatly affecting imaging quality.

SUMMARY

Embodiments of the application provide a periscope lens module of a mobile terminal and the mobile terminal, to resolve a prior-art problem of relatively low photographing imaging quality.

In at least some embodiments, a periscope lens module of a mobile terminal is provided. The module includes a motor housing and a lens, and the lens is located in the motor housing The lens includes an enclosure, a first lens, and a plurality of second lenses, where the enclosure includes a first cylinder and a second cylinder connected to the first cylinder, a diameter of the first cylinder is greater than a diameter of the second cylinder, at least one gap penetrating a sidewall of the first cylinder is disposed on the sidewall, the first lens is fastened in the first cylinder, the plurality of second lenses are fastened in the second cylinder, and the first lens, the plurality of second lenses, the first cylinder, and the second cylinder are coaxially disposed.

In at least some embodiments, the at least one penetrating gap is disposed on the sidewall of the first cylinder, and when the gap is being formed, a part is cut from the arc sidewall of the first cylinder. Therefore, a distance from the first lens to the gap is less than a distance from the first lens to the arc sidewall of the first cylinder. When the lens module is disposed in the mobile terminal, a thickness dimension of the mobile terminal affects a diameter of the first lens. Therefore, when the lens module is being disposed, the gap is made to face a rear housing of the mobile terminal, so that the diameter of the first lens can be increased, thereby reducing an aperture value of the lens module and improving imaging quality.

In at least some embodiments, there are two gaps, and the two gaps are symmetrically disposed on the first cylinder. By using the two symmetrical gaps, space for accommodating the first lens is further expanded, so that the diameter of the first lens can be further increased, thereby improving the imaging quality.

In at least some embodiments, an edge that is of each gap and that is located on an outside of the first cylinder is set to a cutting surface. In an embodiment, a plane is formed by further cutting a part from a position in which the gap is located on the sidewall of the first cylinder, so that the space for accommodating the first lens can be further expanded, thereby increasing the diameter of the first lens and improving the imaging quality.

In at least some embodiments, a distance from a center of the first lens to the cutting surface is not less than a radius of the first lens.

This prevents the first lens from protruding from the first cylinder, and ensures that the first cylinder can protect the first lens.

In at least some embodiments, the module further includes a first fastener, where the first fastener is embedded in the second cylinder and is used to fasten the first lens. The first lens is fastened by using the first fastener. When the first fastener is disposed, the first fastener is circular, and a chamfer is disposed at an end that is of the first fastener and that is far away from the first lens, so that the first fastener is inserted into the second cylinder.

In at least some embodiments, the module further includes at least one second fastener, and the at least one second fastener is one-to-one correspondingly inserted into the at least one gap and is used to fasten the first lens. The first lens is fastened by using the second fastener.

In at least some embodiments, when the first lens is fastened by using the first fastener and the second fastener, the first fastener, the second fastener, and the first lens are disposed in an integrated structure.

In at least some embodiments, each gap is a convex-shape gap, and an end that is of the gap and that has a smaller opening is close to the second cylinder. This is convenient to insert the second fastener into the gap.

In at least some embodiments, a mobile terminal is provided, where the mobile terminal includes a mobile terminal body and the periscope lens module of the mobile terminal according to any one of the foregoing implementation solutions, where the periscope lens module is disposed in the mobile terminal.

In at least some embodiments, a lens is provided, where the lens is applied to a periscope lens module of a mobile terminal, and the lens includes an enclosure, a first lens, and a plurality of second lenses, where the enclosure includes a first cylinder and a second cylinder connected to the first cylinder, a diameter of the first cylinder is greater than a diameter of the second cylinder, at least one gap penetrating a sidewall of the first cylinder is disposed on the sidewall, the first lens is fastened in the first cylinder, the plurality of second lenses are fastened in the second cylinder, and the first lens, the plurality of second lenses, the first cylinder, and the second cylinder are coaxially disposed.

In at least some embodiments, there are two gaps, and the two gaps are symmetrically disposed on the first cylinder.

In at least some embodiments, an edge that is of each gap and that is located on an outside of the first cylinder is set to a cutting surface.

In at least some embodiments, a distance from a center of the first lens to the cutting surface is not less than a radius of the first lens.

In at least some embodiments, the module further includes a first fastener, where the first fastener is embedded in the second cylinder and is used to fasten the first lens.

In at least some embodiments, the module further includes at least one second fastener, and the at least one second fastener is one-to-one correspondingly inserted into the at least one gap and is used to fasten the first lens.

In at least some embodiments, when the first lens is fastened by using the first fastener and the second fastener, the first fastener, the second fastener, and the first lens are disposed in an integrated structure.

In at least some embodiments, each gap is a convex-shape gap, and an end that is of the gap and that has a smaller opening is close to the second cylinder.

In at least some embodiments, the lens is arranged in a width direction of the mobile terminal.

In at least some embodiments, one of the sidewall gap is parallel to a rear housing of the mobile terminal.

In at least some embodiments, a mobile terminal is provided, where the mobile terminal includes a mobile terminal body and the lens according to any one of the foregoing implementation solutions, where the lens is disposed in the mobile terminal.

In the foregoing implementation solutions, the at least one penetrating gap is disposed on the sidewall of the first cylinder, and when the gap is being formed, a part is cut from the arc sidewall of the first cylinder. Therefore, a distance from the first lens to the gap is less than a distance from the first lens to the arc sidewall of the first cylinder. When the lens module is disposed in the mobile terminal, a thickness dimension of the mobile terminal affects a diameter of the first lens. Therefore, when the lens module is being disposed, the gap is made to face a rear housing of the mobile terminal, so that the diameter of the first lens can be increased, thereby reducing an aperture value of the lens module and improving imaging quality.

DESCRIPTION OF EMBODIMENTS

The following describes embodiments of the application in detail with reference to the accompanying drawings.

For ease of understanding the technical solutions in the embodiments, the following first describes a periscope lens module with reference to the accompanying drawings.

Figure 1:
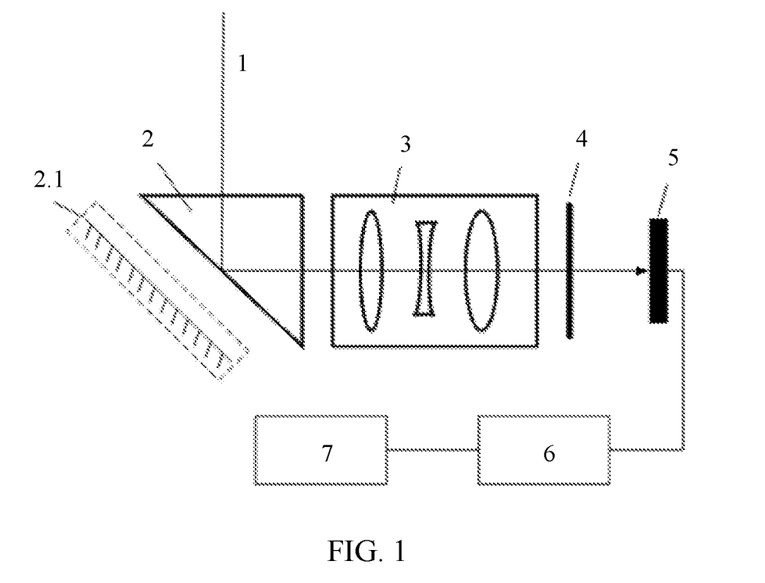
FIG. 1 is a conceptual diagram of a periscope lens module according to one embodiment.

FIG. 1 is a structural conceptual diagram of a lens module according to one embodiment. A structure of the lens module includes a reflecting prism 2 or a reflector 2.1, a lens 3, a light filter 4, an image sensor 5, a signal processing module 6, and a display module 7. An imaging principle of the lens module is as follows: An imaging light ray 1 is reflected by the reflecting prism 2 or the reflector 2.1 (the reflecting prism 2 and the reflector 2.1 have a same function) to the lens 3. The lens 3 has a convergence imaging effect on the light ray 1, an unnecessary light wave (for example, a light wave other than visible light) in the light ray 1 is filtered by the light filter 4, and finally light waves other than the unnecessary light wave in the light ray 1 are converged on the image sensor 5. The signal processing module 6 controls the image sensor 5 to perform optical-to-electrical conversion on a collected optical signal, to obtain an electrical signal, and the processed electrical signal is transmitted to the display module 7 for display.

In addition to the foregoing hardware, the lens module further includes: a focus motor, configured to adjust a lens position to photograph objects at different distances; a stabilization motor, configured to adjust a lens position, so that an image of a photographed object does not blur due to a shake of a user's hand, or the like; and a system control apparatus, including a photographing control unit, configured to set a photographing mode, for example, a black and white mode or a high dynamic mode; a focus control unit, configured to control the focus motor to implement automatic focus; and a stabilization control unit, configured to control the stabilization motor to stably take a photograph. The focus motor, the stabilization motor, the system control apparatus, and the like have similar functions to those in a lens module in a mobile terminal in the prior art, and details are not described herein.

Figure 2:
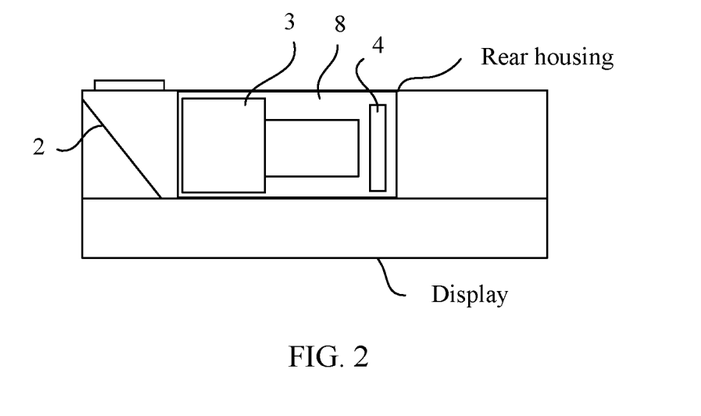
FIG. 2 is a schematic diagram of cooperation between a periscope lens module and a mobile terminal according to one embodiment.

During use, details are shown in FIG. 2. FIG. 2 is a schematic diagram of cooperation between the lens module and a mobile terminal according to one embodiment. The lens module is transversely disposed in the mobile terminal, e.g., the reflecting prism 2 or a reflector 2.1, the lens 3, and the filter 4 (in a propagation direction of the light ray in the imaging lens module) are arranged in a width direction of the mobile terminal. In addition, during disposition, a motor (e.g., the focus motor) housing 8 is fastened in the mobile terminal, and there is a focus adjustment spacing between the lens 3 and the motor housing 8. An aperture value of the lens module directly affects photographing quality such as resolution or a low-illumination imaging capability, and the aperture value depends on a diameter of a lens located at a front end of the lens module. Therefore, in embodiments of the application, the lens in the lens module is improved, to improve imaging quality.

In at least some embodiments, a structure of a lens in a periscope lens module is improved. When the lens is disposed, the lens is disposed in a motor (e.g., a focus motor)

housing. FIG. 4 is a schematic structural diagram of a periscope lens module according to one embodiment. The lens includes an enclosure, a first lens 33, and a plurality of second lenses. As shown in FIG. 4, the enclosure includes a first cylinder 31 with a larger diameter and a second cylinder 32 with a smaller diameter, and the first cylinder 31 and the second cylinder 32 are connected and coaxially disposed. The first lens 33 is disposed in the first cylinder 31 with the larger diameter, the plurality of second lenses are disposed in the second cylinder 32, and the first lens 33 and the plurality of second lenses are coaxially disposed. The first lens 33 is a lens on a light injection side, e.g, the first lens 33 receives a reflected light ray 1 and then propagates the reflected light ray 1 to the second lenses. Also referring to FIG. 2 and FIG. 3, when the first lens 33 is used as the lens on the light injection side, an aperture value depends on a size of the first lens 33. A larger diameter of the first lens 33 indicates a smaller aperture value and better imaging quality. Therefore, to increase a diameter of the first lens 33, space in the motor housing needs to be used to a maximum extent. In embodiments of the application, to increase the diameter of the first lens 33, at least one gap 311 penetrating the first cylinder 31 is disposed on a sidewall of the first cylinder 31. The gap 311 is a gap formed by cutting a part from the sidewall of the first cylinder 31. Therefore, a distance from a center of the first lens 33 to a position with a gap on an outer sidewall of the first cylinder 31 is less than a distance from the center of the first lens 33 to a position without a gap on the outer sidewall of the first cylinder 31. Also referring to FIG. 2, when a lens is disposed, a gap faces a thickness direction of the mobile terminal. Therefore, in the foregoing manner in which the gap is used, it is equivalent that a dimension of the first cylinder 31 in the thickness direction of the mobile terminal is reduced. The dimension in the thickness direction of the mobile terminal is a main dimension limiting a size of the first cylinder 31. Therefore, after the gap reduces the dimension of the first cylinder 31 in the thickness direction of the mobile terminal, the first cylinder 31 can be made larger in dimension, and then the first lens 33 can be made larger.

Figure 3:
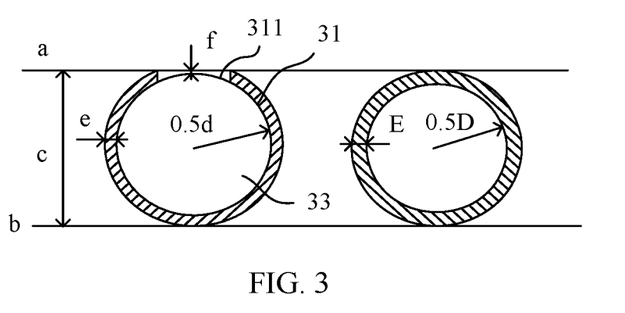
FIG. 3 is a schematic diagram of comparison between a lens module in one embodiment and a lens module in the prior art that are disposed in a mobile terminal.
Figure 4:
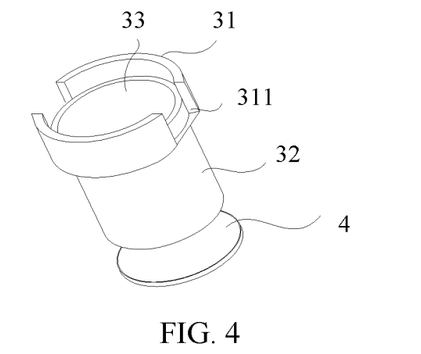
FIG. 4 is a schematic structural diagram of a periscope lens module according to one embodiment.

For ease of understanding the principle of the lens module provided in embodiments of the application, the following describes the principle of the lens module in detail with reference to FIG. 3. FIG. 3 is a schematic diagram of comparison between a lens module in one embodiment of the application and a lens module in the prior art that are disposed in a mobile terminal. A lens module on the left side is the lens module in an embodiment of the application, and only one gap 311 is used on a first cylinder 31 of the lens module. A lens module on the right side is a lens module in which no gap is disposed on a first cylinder. Two horizontal lines in the figure are two parallel auxiliary lines, and the two auxiliary lines are used to help understand width dimensions occupied by the lens modules in a thickness direction of the mobile terminal. The two parallel lines each are tangent to the two cylinders, and a distance c between the two parallel lines is widths occupied by the two different lens modules in the thickness direction of the mobile terminal. It can be intuitively seen from FIG. 3 that, in the lens module in an embodiment of the application, c=diameter d of the first lens+one sidewall thickness e of the first cylinder 31+distance f from a sidewall of the first lens to the gap 311. In the lens module on the right side, c=lens diameter D+sidewall thickness E of the cylinder×2. When the sidewall thickness of the first cylinder 31 in an embodiment of the application is the same as the sidewall thickness of the cylinder on the right side, because the gap 311 is formed by cutting a partial structure from a sidewall of the first cylinder 31, f<E. In this case, when the value c (e.g., the width occupied by the lens in the thickness direction of the mobile terminal) is unchanged, the diameter d of the first lens 33 in an embodiment of the application can be greater than a value of the diameter D of a first lens on the right side. Therefore, in at least some embodiments of the application, the first cylinder 31 is in a form of a non-circular symmetrical structure, so that the diameter of the first lens 33 can be effectively increased. In this way, interior space of a motor housing is fully used, a lens aperture value is reduced, lens optical performance is improved, and photographing experience is improved.

To describe in detail a gap disposition case in an embodiment of the application, the following describes in detail the gap disposition case with reference to accompanying drawings and embodiments described herein.

Embodiment 1

As shown in FIG. 4, in an embodiment, there are two gaps 311, and the two gaps 311 are symmetrically disposed on a first cylinder 31. During disposition, the two gaps are formed by cutting a partial cylinder wall from the first cylinder 31. Therefore, when a lens is disposed in a mobile terminal, the two gaps are parallel to a rear housing of the mobile terminal. Also referring to FIG. 3, in the foregoing disposition manner, a diameter d of a first lens 33 may be increased by 2×(e−f) compared with a diameter of a first lens in a lens module without a gap.

As a limit, f=0. In this case, diameter d of the first lens 33=c. In this case, a circumferential surface of the first lens 33 is flush with a plane on which two tips formed by a gap sidewall and an outer sidewall of the first cylinder 31 are located, to further reduce an aperture value and improve an imaging effect.

In addition, it should be understood that, in at least one embodiment, a quantity of gaps 311 is not limited only to two, but may be any quantity of gaps 311, for example, four or six.

Figure 5:
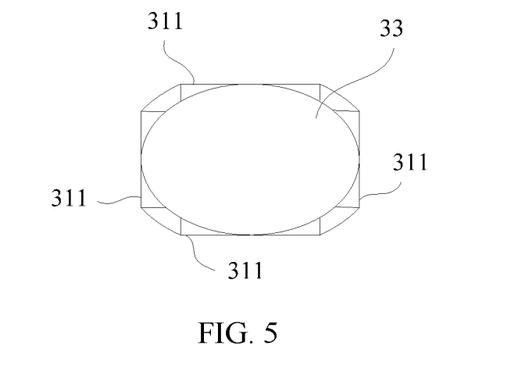
FIG. 5 is a schematic structural diagram of another periscope lens module according to one embodiment.

FIG. 5 is a schematic structural diagram of another periscope lens module according to one embodiment. FIG. 5 shows a case of four gaps 311. When a plurality of gaps 311 are used, it is convenient to fasten a lens module when the lens module is placed in the mobile terminal, provided that any two opposite gaps 311 can be used to cooperate with the mobile terminal.

When a gap is disposed on a sidewall of the first cylinder 31, the first cylinder 31 forms non-circular space. When the first lens 33 is disposed in the first cylinder 31, an eccentricity occurs due to a processing error and an assembly error.

Figure 8:
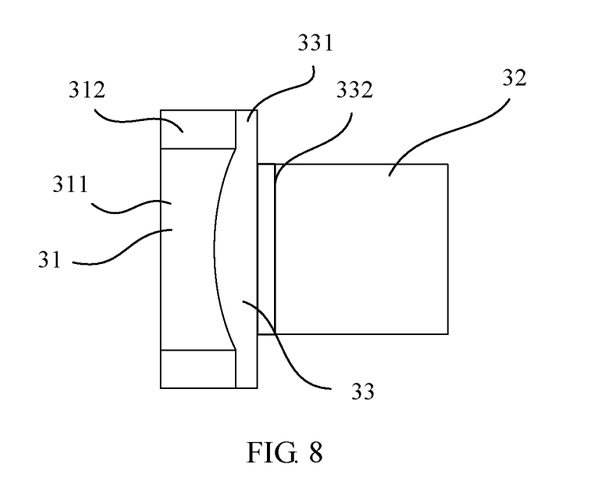
FIG. 8 is a schematic diagram of cooperation between a first lens and a first cylinder according to one embodiment.

FIG. 8 is a schematic diagram of cooperation between a first lens and a first cylinder according to one embodiment. To ensure installation precision of the first lens 33, preferably, referring to FIG. 8, a lens module further includes a first fastener 332. The first fastener 332 is embedded in a second cylinder 32 and is used to fasten the first lens 33. In at least some embodiments, when the first lens 33 is placed in the first cylinder 31, a side of the first lens 33 that faces the second cylinder 32 is connected to the first fastener 332. The first fastener 332 is clamped in the second cylinder 32 and is used to fasten the first lens 33. Because a sidewall of the second cylinder 32 is a complete cylindrical sidewall, when the first fastener 332 is inserted, the first lens 33 can be stably fastened, and installation precision of the first lens 33 can be ensured, to avoid an eccentricity. In addition, for ease of installation, the first fastener 332 is circular, and a chamfer is disposed at an end of the first fastener 332 that is far away from the first lens 33. By using the chamfer structure, the first fastener 332 can be conveniently inserted into the second cylinder 32.

In addition, when the first fastener 332 is disposed, the first fastener 332 and the first lens 33 are formed in an integrated forming manner. This ensures stability of a connection between the first lens 33 and the first fastener 332, and also ensures relative precision between the first lens 33 and the first fastener 332.

Embodiment 2

Figure 6:
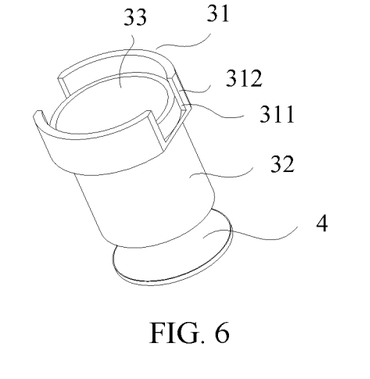
FIG. 6 is a schematic structural diagram of another periscope lens module according to one embodiment.

FIG. 6 is a schematic structural diagram of another periscope lens module according to one embodiment. As shown in FIG. 6, an edge of each gap 311 that is located on an outside of a first cylinder 31 is set to a cutting surface 312. In other words, each gap 311 corresponds to one cutting surface 312. A gap 311 and a cutting surface 312 corresponding to the gap 311 are used as an example. It may be understood that the cutting surface 312 is formed by cutting a part from a sidewall of the first cylinder 31, and then the gap 311 is set up on the cutting surface 312, where the gap 311 is connected to a hollow part of the first cylinder 31. Alternatively, it may be understood that the gap 311 is set up on a sidewall of the first cylinder 31, and then the cutting surface 312 is formed by cutting a part from the sidewall of the first cylinder 31, where the cutting is performed along the gap 311. In this way, a one-to-one correspondence between the gaps 311 and the cutting surfaces 312 is formed.

Figure 7:
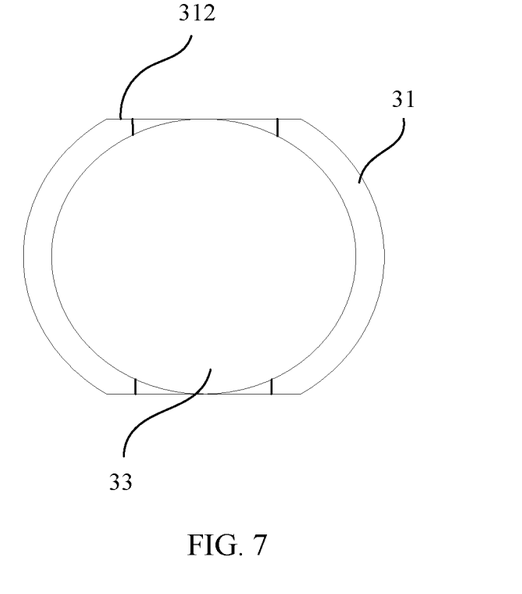
FIG. 7 is a schematic structural diagram of another periscope lens module according to one embodiment.

During disposition, a distance from a center of a first lens 33 to the cutting surface 312 is not less than a radius of the first lens 33, to ensure that the first lens 33 is always located in the first cylinder 31 and does not protrude from the first cylinder 31, so as to ensure security of the first lens 33. FIG. 7 is a schematic structural diagram of another periscope lens module according to one embodiment. As shown in FIG. 7, in at least some embodiments, in an extreme case, the distance from the center of the first lens 33 to the cutting surface 312 is equal to the radius of the first lens 33. In this case, each cutting surface 312 is a tangent plane of the first lens 33. In this structure, space in a motor housing can be used to a maximum extent, in other words, the diameter of the first lens 33 is maximized, to reduce an aperture value and improve an imaging effect.

Figure 9:
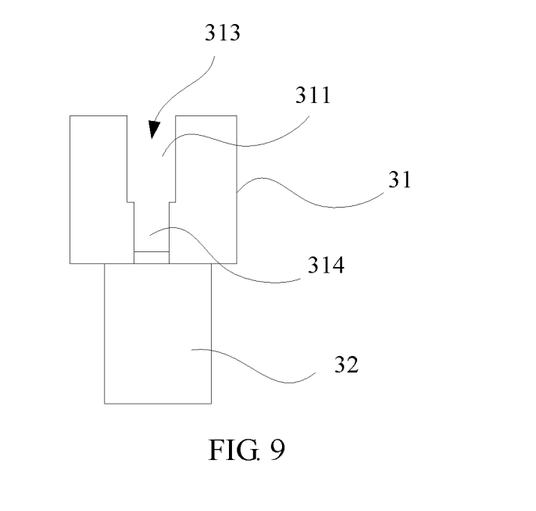
FIG. 9 is a schematic structural diagram of a gap according to one embodiment.

It should be understood that, regardless of which of the foregoing solutions is used, during disposition, the gap 311 may be further used as a structure used to fasten the first lens 33. During disposition, as shown in FIG. 8, a lens module further includes at least one second fastener 331, and the at least one second fastener 331 is one-to-one correspondingly inserted into at least one gap 311 and is used to fasten the first lens 33. During assembly, the first lens 33 is inserted in an opening direction of the gap 311. During insertion, the second fastener 331 disposed on the first lens 33 cooperates with the gap 311 to fasten the first lens. During disposition, for ease of fastening the first lens 33, structures of the second fastener 331 and the gap 311 that are in cooperation may be improved. For example, in at least some embodiments, a chamfer is disposed on a side of the second fastener 331 that faces the gap 311, or a chamfer is correspondingly disposed on the gap 311, so that the second fastener 331 is inserted into the gap 311. In addition, to avoid a case in which in a process of inserting the first lens 33, it is difficult to assemble due to a long friction distance between the gap 311 and the second fastener 331, in another embodiment, a stepped gap 311 may be used as the gap 311. FIG. 9 is a schematic structural diagram of a gap according to one embodiment. As shown in FIG. 9, each gap 311 is a convex-shape gap. In at least some embodiments, a shape of the gap 311 is a "convex" shape, but a boundary of the "convex" shape is not strictly limited. As shown in FIG. 9, an opening 313 is formed at an end of the gap 311 on a light injection side of the first cylinder 31, and an end of the gap 311 that is close to a second cylinder 32 has a smaller opening than the opening at the end 313. In other words, the gap has a larger opening 313 at an end of the first cylinder 31, and the gap has a smaller opening 314 at an end close to the second cylinder 32, and the second fastener 331 is used to cooperate with the end that is of the gap and that has the smaller opening. When the first lens 33 is inserted, there is a sufficient spacing between an end of the gap that has the larger opening and the second fastener 331 to place the first lens 33 in the first cylinder 31. The first lens 33 is clamped to the gap only in a last position, namely, a position in which the first lens 33 needs to be fastened. This facilitates installation of components.

In addition to the second fastener 331, the first lens 33 provided in an embodiment may be fastened by using the first fastener 332 mentioned in Embodiment 1. In other words, in an embodiment, the first lens 33 may be fastened through cooperation between the second fastener 331 and the gap 311, or the first lens 33 may be fastened through cooperation between the first fastener 332 and the second cylinder 32. Regardless of which of the foregoing fastening manners is used, the first lens 33 can be fastened, and installation precision of the first lens 33 can be ensured. In at least some embodiments, to ensure the precision, preferably, both the first fastener 332 and the second fastener 331 are disposed on the first lens 33. Therefore, the precision can be effectively improved.

In addition, when the second fastener 331 is disposed, the second fastener 331 and the first lens 33 are formed in an integrated forming manner. This ensures stability of a connection between the first lens 33 and the second fastener, and also ensures relative precision between the first lens 33 and the second fastener. Likewise, when the first fastener 332 and the second fastener 331 are used, the first fastener 332, the second fastener 331, and the first lens 33 are also formed in an integrated forming structure manner.

For ease of understanding an effect of the lens module provided in an embodiment, a long-focus lens provided in an embodiment is compared with a long-focus lens in the prior art. In an embodiment, focal length f of the long-focus lens=10.0 mm, a wall thickness of the first cylinder 31 is 0.3 mm, and a thickness of the lens module (including the first lens 33 and the first cylinder 31) is 5.0 mm. In an embodiment, a lens cone may not occupy a dimension in a module height direction (e.g., a thickness direction of a mobile terminal), and lens aperture value F=2.0. A lens module in the prior art is in a circular symmetrical structure, and lens aperture value F>2.0. Therefore, in the lens module structure in an embodiment of the application, namely, in a non-circular symmetrical structure, a module height can be fully used to minimize a lens aperture value, improve lens optical performance, and improve photographing experience.

It can be learned from the descriptions in Embodiment 1 and Embodiment 2 that, in the lens module provided in the embodiments of the application, a structure of the first cylinder 31 is improved, and then the diameter of the first lens 33 is increased, so that the aperture value is reduced, and the imaging effect is improved.

In addition, an embodiment of the application further provides a mobile terminal. The mobile terminal includes a mobile terminal body and the foregoing periscope lens module disposed in the mobile terminal.

The mobile terminal may be a common mobile terminal such as a mobile phone or a tablet computer. This is not limited herein. In the mobile terminal, a lens module used in the mobile terminal is the lens module in the foregoing embodiments. At least one penetrating gap is disposed on a sidewall of a first cylinder, and when the gap is being formed, a part is cut from the arc sidewall of the first cylinder. Therefore, a distance from a first lens to the gap is less than a distance from the first lens to the arc sidewall of the first cylinder. When the lens module is disposed in the mobile terminal, a thickness dimension of the mobile terminal affects a diameter of the first lens. Therefore, when the lens module is being disposed, the gap is made to face a rear housing of the mobile terminal, so that the diameter of the first lens can be increased, thereby reducing an aperture value of the lens module and improving imaging quality.

Apparently, a person ordinary skill in the art can make various modifications and variations to embodiments of the application without departing from the broader spirit and scope. The application is intended to cover these modifications and variations provided that they fall within the scope of the claims of the application and their equivalent technologies.

What is claimed is:

1. A lens, wherein the lens is applied to a periscope lens module of a mobile terminal, and
the lens comprises an enclosure, a first lens, and a plurality of second lenses, wherein the enclosure comprises a first cylinder and a second cylinder connected to the first cylinder, a diameter of the first cylinder is greater than a diameter of the second cylinder, at least one gap penetrating a sidewall of the first cylinder is disposed on the sidewall, the first lens is fastened in the first cylinder, the plurality of second lenses are fastened in the second cylinder, and the first lens, the plurality of second lenses, the first cylinder, and the second cylinder are coaxially disposed, wherein the at least one gap is adjacent to the first lens and faces to a rear housing of the mobile terminal, wherein a distance from a center of the first lens to a cutting surface of the first lens is less than d+e, wherein d is a radius of the first lens and e is a sidewall thickness of the first cylinder.

2. The lens of claim 1, wherein there are two gaps, and the two gaps are symmetrically disposed on the first cylinder.

3. The lens of claim 1, wherein an edge that is of each gap and that is located on an outside of the first cylinder is set to a cutting surface.

4. The lens of claim 3, wherein a distance from a center of the first lens to the cutting surface is not less than a radius of the first lens.

5. The lens of claim 1, wherein the periscope lens module further comprises a first fastener, and the first fastener is embedded in the second cylinder and is used to fasten the first lens.

6. The lens of claim 5, wherein the periscope lens module further comprises at least one second fastener, and the at least one second fastener is one-to-one correspondingly inserted into the at least one gap and is used to fasten the first lens.

7. The lens of claim 6, wherein when the first lens is fastened by using the first fastener and the second fastener, the first fastener, the second fastener, and the first lens are disposed in an integrated structure.

8. The lens of claim 7, wherein each gap is a convex-shape gap, and an end that is of the gap and that has a smaller opening is close to the second cylinder.

9. The lens of claim 1, wherein the lens is arranged in a width direction of the mobile terminal.

10. The lens of claim 1, wherein one of the at least one sidewall gap is parallel to the rear housing of the mobile terminal.

11. A periscope lens module of a mobile terminal, comprising a motor housing and the lens of claim 1, wherein the lens is located in the motor housing.

12. A mobile terminal, comprising a mobile terminal body and the periscope lens module of the mobile terminal of claim 11, wherein the periscope lens module is disposed in the mobile terminal.

13. A mobile terminal, comprising: a mobile terminal body; and a lens comprising an enclosure, a first lens, and a plurality of second lenses, wherein the enclosure comprises a first cylinder and a second cylinder connected to the first cylinder, a diameter of the first cylinder is greater than a diameter of the second cylinder, at least one gap penetrating a sidewall of the first cylinder is disposed on the sidewall, the first lens is fastened in the first cylinder, the plurality of second lenses are fastened in the second cylinder, and the first lens, the plurality of second lenses, the first cylinder, and the second cylinder are coaxially disposed, wherein the at least one gap is adjacent to the first lens and faces to a rear housing of the mobile terminal, where a distance from a center of the first lens to a cutting surface of the first lens is less than d+e, wherein d is a radius of the first lens and e is a sidewall thickness of the first cylinder.

14. The mobile terminal of claim 13, wherein there are two gaps, and the two gaps are symmetrically disposed on the first cylinder.

15. The mobile terminal of claim 13, wherein an edge that is of each gap and that is located on an outside of the first cylinder is set to a cutting surface.

16. The mobile terminal of claim 15, wherein a distance from a center of the first lens to the cutting surface is not less than a radius of the first lens.

17. The mobile terminal of claim 13, further comprising a first fastener, and the first fastener is embedded in the second cylinder and is used to fasten the first lens.

18. The mobile terminal of claim 17, further comprising at least one second fastener, and the at least one second fastener is one-to-one correspondingly inserted into the at least one gap and is used to fasten the first lens.

19. The mobile terminal of claim 18, wherein when the first lens is fastened by using the first fastener and the second fastener, the first fastener, the second fastener, and the first lens are disposed in an integrated structure.

20. The mobile terminal of claim 19, wherein each gap is a convex-shape gap, and an end that is of the gap and that has a smaller opening is close to the second cylinder.

* * * * *